C. H. CUSHING.
Stop-Cocks.
No. 223,486. Patented Jan. 13, 1880.
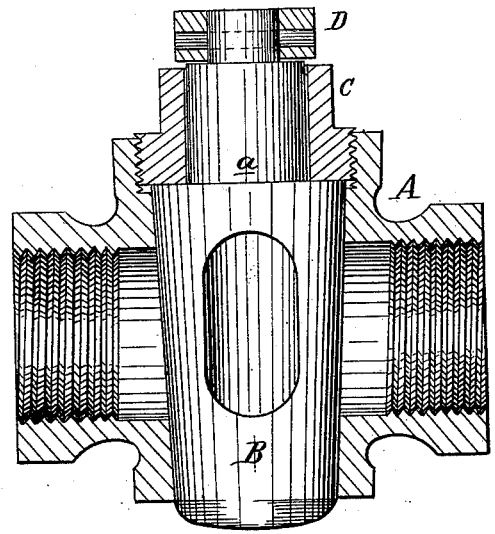
WITNESSES:
Henry N. Miller
C. Sedgwick
INVENTOR:
C. H. Cushing
BY Munn & Co
ATTORNEYS.

UNITED STATES PATENT OFFICE.

CHARLES H. CUSHING, OF TIDIOUTE, PENNSYLVANIA.

STOP-COCK.

SPECIFICATION forming part of Letters Patent No. 223,486, dated January 13, 1880.

Application filed October 8, 1879.

*To all whom it may concern:*

Be it known that I, CHARLES H. CUSHING, of Tidioute, in the county of Warren and State of Pennsylvania, have invented a new and Improved Stop-Cock, of which the following is a specification.

The drawing represents a vertical sectional elevation of the device.

The object of this invention is to provide an improved device for adjusting or locking and unlocking the plug of a stop-cock.

In the drawing, A represents the body of the cock, which may have either an open or a closed bottom. B is the stop or plug. C is the screw-lock nut, placed on the shank of the plug B; and D is the fixed nut or collar.

As shown in the drawing, the nut C screws inside of the body A; but the same purpose will be served if the shoulder a of the plug B be extended above the body A and the nut C, that rests on the said shoulder a, be made to turn down over a screw cut on the outside of the said body A. The purpose of this nut C is to force and hold the plug B down in its place, and when the said plug B is loosened by the unscrewing of the nut C it (the plug B) can be readily turned by taking hold of the collar D.

Both the nut C and collar D may be provided with handles or wheels to facilitate their turning.

It will be seen that by the use of the nut C the plug B may be firmly held in any desired position against any pressure of the liquid contained in the pipe to which the cock may be attached, and that all wear on the plug B or on its seat in the body A may be compensated for by slightly turning down the said nut C; also, by unscrewing the nut C the plug B may be forced up and loosened from its seat in the body A, so that the plug B may be readily turned to any desired position.

Having thus described my invention, I claim as new and desire to secure by Letters Patent—

The combination, with a cock-body, A, having taper hole, and unthreaded plug B, tapered to fit said hole, of the lock-nut C, arranged to screw within the body against a shoulder of plug to prevent it from turning, and to unscrew against the fixed collar to loosen it from its seat, substantially as shown and described.

CHAS. H. CUSHING.

In presence of—
JAMES C. LONG,
WM. H. CATERN.